United States Patent
Freyler

[11] 3,713,516
[45] Jan. 30, 1973

[54] TELESCOPIC SHOCK ABSORBER FOR VEHICLES

[76] Inventor: Adalbert Freyler, Brillerstrasse 99, Wuppertal-Elberfeld, Germany

[22] Filed: Aug. 2, 1971

[21] Appl. No.: 167,913

[30] Foreign Application Priority Data

May 5, 1971 Germany.................P 21 22 118.1

[52] U.S. Cl.........................188/129, 267/9 B
[51] Int. Cl............................F16f 7/08, B60g 13/04
[58] Field of Search.......188/1 B, 129; 267/9 B, 9 C, 267/33, 63 R, 63 A, 153

[56] References Cited

UNITED STATES PATENTS

| | | |
|---|---|---|
| 2,212,759 | 8/1940 | Tea..................................188/129 X |
| 2,459,537 | 1/1949 | Oberstadt.............................188/129 |
| 2,507,760 | 5/1950 | Dath....................................188/129 |
| 3,332,523 | 7/1967 | Chambers...........................188/129 |

Primary Examiner—Duane A. Reger
Attorney—Arthur Schwartz et al.

[57] ABSTRACT

A device for oscillation damping and shock absorption by differential friction, for use especially as a telescopic shock absorber in vehicles, where the plunger inside the cylinder is split along an oblique separation line, one of the plunger parts being axially preloaded against the others to create radial frictional pressure and differential axial friction resistance, depending upon whether the plunger motion is coincident or opposite to the preload.

8 Claims, 3 Drawing Figures

PATENTED JAN 30 1973 3,713,516

INVENTOR
Adalbert FREYLER

By Arthur Schwartz his ATTORNEY

TELESCOPIC SHOCK ABSORBER FOR VEHICLES

BACKGROUND OF THE INVENTION

1. Field of the Invention

The invention relates to shock absorbers and mechanical oscillation dampers, and in particular to telescopic shock absorbers for use with motor vehicles, where the resistance to the telescoping motion in one direction is different to the resistance in the opposite direction.

2. Description of the Prior Art

The prior art in the field of shock absorbing devices includes a variety of suggestions to obtain different motion resistances under reciprocating motion. One of these known devices includes a plunger arrangement using an expanding plunger, where a tapered piston engages a matching hollow taper which is axially movable relative to the latter so that, when the plunger is pushed into the device, one tapered surface moves ahead of the other. Another suggestion includes an arrangement of a plurality of friction elements in the form of sectors which engage a frustum-shaped plunger body where the reference surface again moves ahead of the mating surfaces during compression of the shock absorber, the sectors being spring-loaded against the plunger rod in such a way that they are urged against the frustum surface. All these prior art devices are of a relatively complex structure which makes them costly in production.

SUMMARY OF THE INVENTION

It is a primary objective of the invention to provide a shock absorber device of the earlier-mentioned type which distinguishes itself from the prior art devices by its simplicity, robustness, and great longevity, in addition to the fact that its resistance can be adjusted simply and accurately to insure reliable operation.

The invention proposes to attain this objective by suggesting a device where the plunger is split into two parts along an oblique separation plane, one of the plunger parts being attached clearance-free to the rod and reaching into the cylinder bore, while the other plunger part is movable relative to the rod, both axially and radially, a spring urging this plunger part against the plunger part which is attached to the rod end.

As a result of this arrangement, retraction of the plunger causes the movable plunger part to be pushed radially against the inner wall of the cylinder bore, by virtue of the axial friction force between the movable plunger part and the bore which acts on the oblique separation plane, so that the plunger creates greater axial resistance against extension of the shock absorber than against its compression. The spring which urges the movable plunger part against the opposite plunger part at the rod end increases this friction effect. The resistance against axial displacement during insertion of the plunger, i.e., compression of the shock absorber, is greatly reduced as a result of the opposite direction of friction relative to the separation plane, allowing the shock absorber to be compressed against a small resistance.

In view of its structural simplicity and robustness, the shock absorber of the invention has a great longevity and operational reliability. Its component parts are very inexpensive, and they can be replaced quickly and at minimal costs, thereby reducing the maintenance costs of the vehicle involved. Having no valves or similar components, the device is safe against malfunction and breakdown. A further advantage of the device of the invention is the fact that it can be adjusted for more or less pronounced motion resistance differential in the two directions. For this purpose, it is merely necessary to choose a plunger with a differently inclined separation plane. The operation of this shock absorber is not affected by temperature variations. The operational advantage of providing a differential resistance which is independent of the plunger speed is one of the important characteristics of the shock absorber of the invention, as opposed to the hydraulic-type shock absorber which requires valves subject to possible malfunction and where, during a slow displacement of the plunger such as it occurs during negotiation of a road curve, the oil merely flows from one side of the plunger to the other side. Furthermore, the oil is affected by different temperatures, and overheating can cause undesirable foaming.

An additional advantage of the invention is found in the fact that it can be used for both light and heavy automobiles, for medium-heavy and heavy trucks, as well as for heavy tracked vehicles, even armored tracked vehicles. Especially with the last-mentioned type of vehicle, the operating conditions are so severe that the known, expensive hydraulic shock absorbers last only a relatively short time, their valves breaking down frequently. Under such circumstances, the absence of valves, in combination with the simplicity and robustness of the design of the invention, offer considerable economies of maintenance and supply.

The two plunger parts are preferably fabricated of plastic material. Preferably, an additional slip disc is arranged in the oblique separation plane between the plunger parts, the slip disc having a radial clearance against the cylinder bore. This slip disc, preferably of metal, prevents the two plastic plunger parts from sticking against one another under pressure. In a preferred design, the slip disc includes a radial shoulder by which it engages the plunger part which is mounted on the rod end.

The spring element of the preferred design is arranged between a shoulder of the plunger rod and the back face of the movable plunger part, so as to urge the movable plunger part against the oblique slip disc in the separation plane. Preferably, the spring element consists of a plurality of Belleville washers which have the advantage of requiring little space, while giving a sufficiently high spring pressure with a strong progressive spring rate. It is, of course, possible to replace the Belleville washers by other spring elements, such as helical springs, self-damping springs, rubber springs, and the like, in accordance with particular desires and requirements.

In order to keep the length of the movable plunger part to a minimum, it is possible to accommodate the spring element inside an axially recessed bore on the back side of the movable plunger part. The diameter of this recessed bore must be large enough to allow for the radial displacement of the plunger part, including possible additional displacement due to wear.

It may be advantageous, especially in applications on passenger cars, to arrange the entire split plunger assembly between spring elements linking it to the plunge rod, the spring elements being preferably two stacks of Belleville washers. This design offers an additional elasticity during the compression motion of the shock absorber, the additional elasticity being desirable, because it improves the riding comfort of the car. In this arrangement, the spring response on the upper side of the plunger should be softer than the spring response on the lower side. This effect is obtained by arranging a high stack of Belleville washers on the upper side of the plunger assembly and a low stack of Belleville washers on the lower, rod-end side of the plunger assembly.

BRIEF DESCRIPTION OF THE DRAWINGS

Further special features and advantages of the invention will become apparent from the description following below, when taken together with the accompanying drawing which illustrates, by way of examples, two embodiments of the invention, represented in the various figures as follows.

DESCRIPTION OF THE PREFERRED EMBODIMENTS

Figure 1:
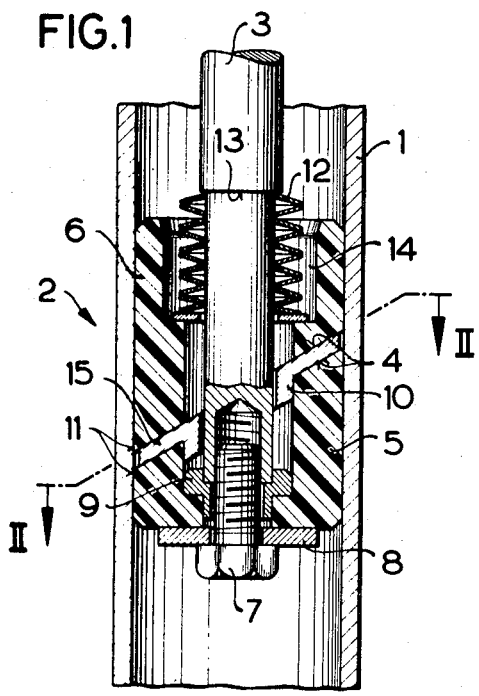
FIG. 1 shows, in a vertical longitudinal cross-section, a first embodiment of the invention, portions of the cylinder and rod being cut away.
Figure 2:
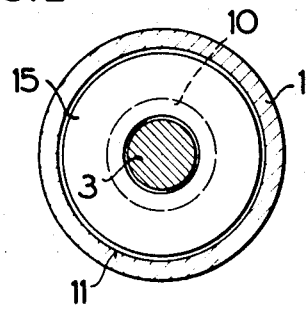
FIG. 2 is a cross-section along the line II—II of FIG. 1.

The drawing, in FIG's. 1 to 3, shows only those parts of the shock absorber device which are particularly relevant to the invention, omitting those parts which are of conventional design.

As can be seen in FIG. 1, the shock absorber of the invention includes a tube forming the cylinder 1 whose lower end is fastened to a portion of the vehicle in a known manner, a plunger assembly 2, and a plunger rod 3 whose upper end extends beyond the cylinder 1 and is fastened to another part of the vehicle.

The plunger assembly 2 is split along an oblique separation plane 4 into two plunger parts, a lower plunger part 5 and an upper plunger part 6. The lower plunger part 5 is firmly attached to the lower end of the rod 3 by means of a screw 7 and a washer 8. A positioning ring 9 centers the plunger part 5 on the rod end. On its side facing the oblique separation plane, the plunger part 5 also carries a metallic slip disc 15 which includes a radial shoulder 10 positioning it relative to the plunger part. The outside diameter of the slip disc 15 is small enough to leave a radial clearance to the bore of the cylinder 1.

The difference between the sliding resistance under push or pull, respectively, can be varied within a large range by selecting a corresponding angle for the oblique separation plane 4 between the plunger parts. The more the oblique separation plane deviates from the radial plane, the greater will be the difference between the frictional resistance against push in compression, versus pull in extension of the shock absorber. The upper plunger part 6 is arranged for limited axial as well as radial mobility relative to the plunger rod 3. A spring arrangement, consisting preferably of a stack of Belleville washers 12, urges it against the oblique separation plane and against the lower plunger part 5. The stack of Belleville washers 12 is arranged inside an axially recessed bore 14 in the upper plunger part 6, the upper end of the washer stack 12 being retained by a radial shoulder 13 on the rod 3. The recessed bore 14 has a diameter large enough to allow for the radial displacement of the mobile plunger part relative to the plunger rod and washer stack, including any additional displacement due to plunge wear.

The lower plunger part 5 and the upper plunger part 6 are preferably made of a plastic material which is highly resistent against wear and which has a friction coefficient that produces the desired damping forces in frictional motion against the bore of the cylinder 1.

Figure 3:
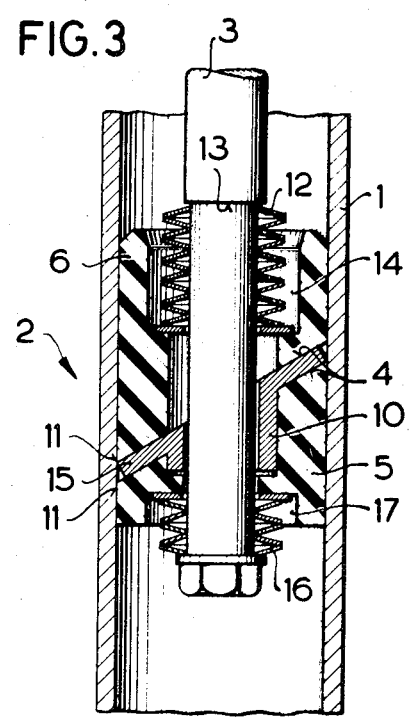
FIG. 3 shows a longitudinal cross-section, comparable to that of FIG. 1, representing a second embodiment of the invention.

The second embodiment, as shown in FIG. 3 illustrates a plunger assembly which is somewhat different from that shown in FIG. 1. Here, the lower plunger part 5 is not firmly clamped against the lower end of the rod 3, but is axially movably on the rod against a second stack of Belleville washers 16 which urges the lower plunger part 5 upwardly against the mobile plunger part 6. To accommodate the lower Belleville washer stack 16 between the plunger part 5 and the rod end, the plunger part 5 has an axially recessed bore 17. The remaining parts of this assembly are similar to those described in connection with FIG. 1. As the lower stack of Belleville washers 16 is much shorter than the upper stack 12 between the rod shoulder 13 and the upper plunger part 6, the spring response against the upper washer stack 12 is much softer than that obtained against the lower washer stack 16.

I claim:

1. A device for oscillation damping and shock absorption by differential friction, for use especially as a telescopic shock absorber in vehicles, comprising in combination:

a casing with a cylinder bore, including known attachment means at one end thereof;

a plunger rod penetrating partially into the cylinder bore from the other end thereof, including attachment means at one end thereof capable of transmitting axial push and pull forces to the rod relative to the casing;

a plunger assembly mounted on the penetrating end of the plunger rod for reciprocating motion inside the cylinder bore, the plunger assembly being split along an oblique separation plane into a lower plunger part which is connected to the penetrating end of the plunger rod and into an upper plunger part which has limited axial and radial mobility relative to the lower plunger part and the rod; and means to axially preload the upper plunger part against the oblique separation plane, so as to create a radial frictional pressure between the plunger assembly and the cylinder bore which is different, depending upon whether the axial friction resistance against motion thereby created is coincident or opposite in direction with the axial preload on the upper plunger part.

2. The device as defined in claim 1, wherein the preloading means include spring means supported against the plunger rod and which urge the upper plunger part downward against the oblique separation plane.

3. The device as defined in claim 2, further comprising:

a slip disc arranged in alignment with the oblique separation plane and centered relative to the lower plunger part and plunger rod.

4. The device as defined in claim 3, wherein the slip disc includes a centering shoulder extending downwardly into a matching centering bore of the lower plunger part.

5. The device as defined in claim 3, wherein the plunger parts are of wear-resistant plastic material, the slip disc being of metal and of such a diameter that a radial clearance exists between it and the cylinder bore of the casing.

6. The device as defined in claim 2, the spring means being a stack of Belleville washers, the upper plunger part including an axially recessed bore to accommodate the washer stack, and the plunger rod including a retaining shoulder.

7 The device as defined in claim 2, further comprising:

lower spring means in the connection between the lower plunger part and the penetrating end of the plunger rod, the lower spring means urging the lower plunger part upward relative to the rod and against the preloading spring means, thereby permitting axial motion of the entire plunger assembly relative to the plunger rod.

8. The device as defined in claim 7, wherein both the preloading spring means and the lower spring means are stacks of Belleville washers, the lower washer stack being shorter than the other to give a harder response against compression as compared to the upper preloading washer stack.

* * * * *